UNITED STATES PATENT OFFICE.

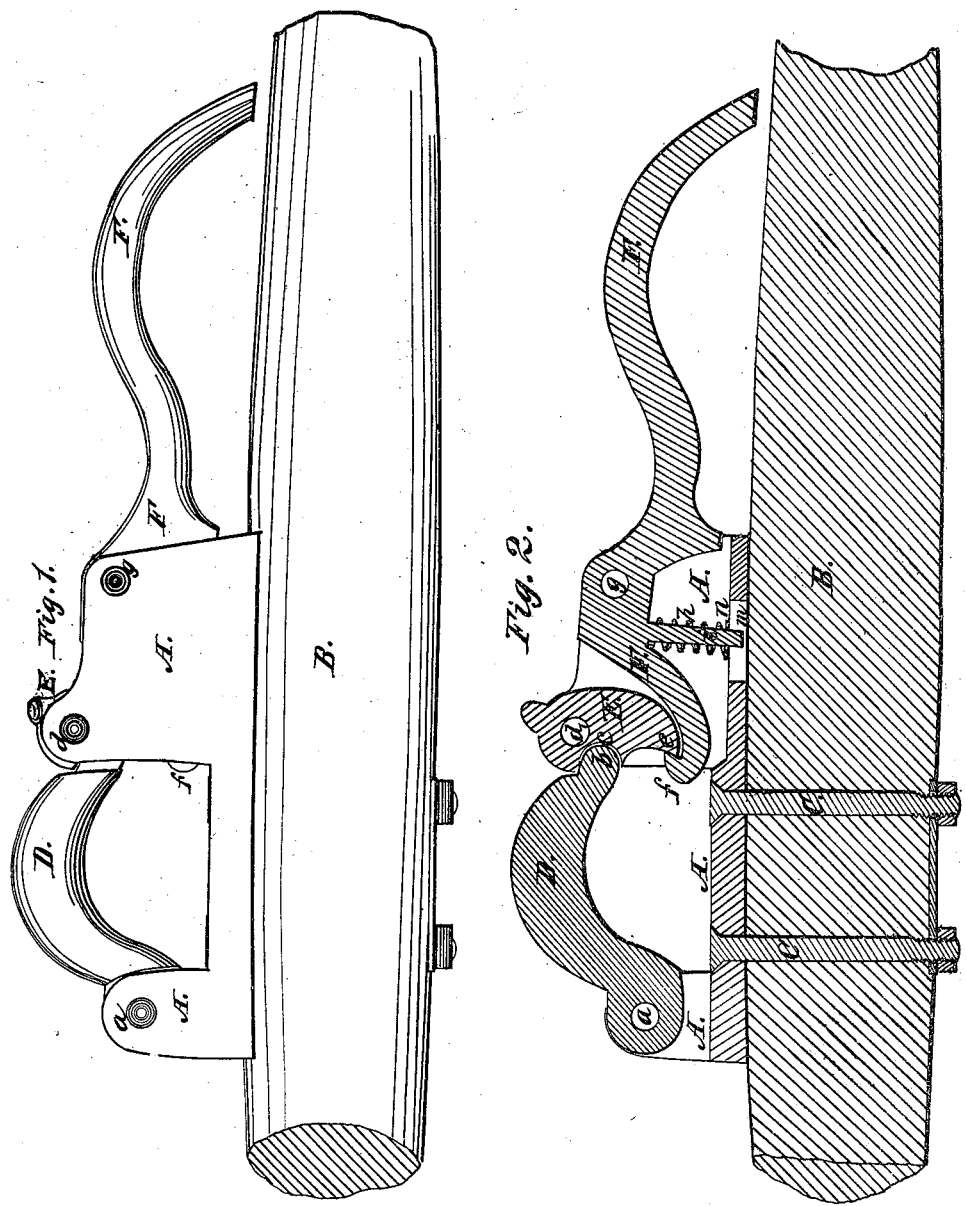

CHARLES BENTZ, OF MINDENVILLE, NEW YORK.

IMPROVED CANAL-BOAT TOW-LINE ATTACHMENT.

Specification forming part of Letters Patent No. 44,154, dated September 13, 1864.

*To all whom it may concern:*

Be it known that I, CHARLES BENTZ, of Mindenville, in the county of Montgomery and State of New York, have invented certain new and useful Improvements in Whiffletree-Hooks for the Tow-Lines of Canal-Boats or other Similar Purposes; and I do hereby declare that the following is a full, clear, and exact description of the construction and operation of the same, reference being had to the accompanying drawings, making a part of this specification, in which—

Figure 1 represents a view of the whiffletree-hook as connected to a whiffletree. Fig. 2 represents a longitudinal section through the same, showing the interior thereof.

Similar letters of reference, where they occur in the separate figures, denote like parts of the contrivance in both drawings.

My invention consists in the construction and combined arrangement of the hinged bar, tumbler, and lever, so as to be easily united to the whiffletree, and so that the cockeye of a trace or tow-line may be easily attached thereto and readily detached therefrom, as may be required.

To enable others skilled in the art to make and use my invention, I will proceed to describe the same with reference to the drawings.

A is a cast hollow box shaped frame, which is united to the whiffletree B by the bolts C C, or otherwise, to make it firm and secure.

To one end of the frame or box A is hinged, as at *a*, a curved bar, D, the free end, *b*, of which is rounded off, so as to take into a correspondingly-rounded recess, *c*, in the tumbler E, which is pivoted to the frame at *d*. This tumbler E is of a cam-shaped form, and having a kind of hooked point, *e*, that interlocks with a projection or catch, *f*, upon the end of the lever F, which is also pivoted to the frame, as at *g*, and has, moreover, a spring, *h*, connected with it, to hold it in connection with the tumbler E, as shown in Fig. 2. To attach a tow-line or other thing to this hook, it is only necessary to press the line or trace against the swing-bar D and force it inward—the tumbler from its form easily giving way to this movement. When the cockeye or line has passed over the free end of the swing-bar and the pressure eased off, the spring *h* throws up the point *f* of the lever F, which catches the point *e* of the tumbler, and the draft on the line draws the point of the swing-bar D into the recess of the tumbler, in which position, as shown in Fig. 2, it will be firmly held against any strain upon the tow-line. To disengage the tow-line or trace, it is only necessary to raise up the end of the lever F, which releases the tumbler E, and the draft continuing on the swing-bar D it flies up and releases the line, allowing it to slip off. A small boy—such as usually drive horses upon a canal—can manage this whiffletree-hook with the greatest readiness, and upon the approach of any necessity for detaching the line, however sudden it may be. The spring *h* must, of course, move in the arc of a circle as the lever moves, and for this purpose a stud, *i*, is attached to the lever around which the spring is placed, and a slot, *m*, is made in the frame A for the stud to move through; and that the spring may not cramp or bind on the frame a washer, *n*, is united to it, which washer slides upon the frame.

Having thus fully described my invention and its operation, what I claim is—

The construction and combined arrangement of the swing-bar, the tumbler, and the lever, for the purpose of forming a whiffletree-hook for tow-lines or other purposes, the whole operating together in the manner and for the purpose substantially as described.

CHARLES BENTZ.

Witnesses:
G. J. WHEELER,
JOHN WHYLAND.